United States Patent
Franiel

[15] 3,692,235
[45] Sept. 19, 1972

[54] LAMINATES
[72] Inventor: Carol Ann Franiel, 3 Cherry Tree Ave., Staines, England
[22] Filed: July 17, 1970
[21] Appl. No.: 55,760

[30] Foreign Application Priority Data

July 21, 1969    Great Britain..........36,575/69

[52] U.S. Cl.....................................232/1, 232/43.2
[51] Int. Cl................................................A65f 1/00
[58] Field of Search.......232/1, 43.1, 43.2, 1 E, 43.3; 161/93, 403

[56] References Cited

UNITED STATES PATENTS

| | | | |
|---|---|---|---|
| 3,509,833 | 5/1970 | Cook | 161/93 X |
| 2,703,775 | 3/1955 | Panagrossi | 166/78 |
| 3,523,056 | 8/1970 | Horning | 161/93 |
| 2,726,977 | 12/1955 | See | 161/93 X |
| 3,529,766 | 9/1970 | Mott | 232/43.2 |
| 1,713,890 | 5/1929 | Clark | 232/43.2 |
| 3,211,367 | 10/1965 | Jessop | 232/43.2 |
| 3,493,460 | 2/1970 | Windecker | 161/93 |

*Primary Examiner*—Francis K. Zugel
*Attorney*—Arthur B. Colvin

[57] ABSTRACT

The invention provides a laminate comprising a ceramic layer faced with a fabric impregnated with synthetic rubber. The laminate is fire-proof and finds particular utility in the construction of waste disposal containers. The invention further provides a container comprising a waste inlet, an outer wall formed of a laminate in accordance with the invention, an inner bag to receive the waste and means operable from outside the container to draw the base of the inner bag towards the waste inlet thereby discharging the waste through the inlet.

1 Claim, 3 Drawing Figures

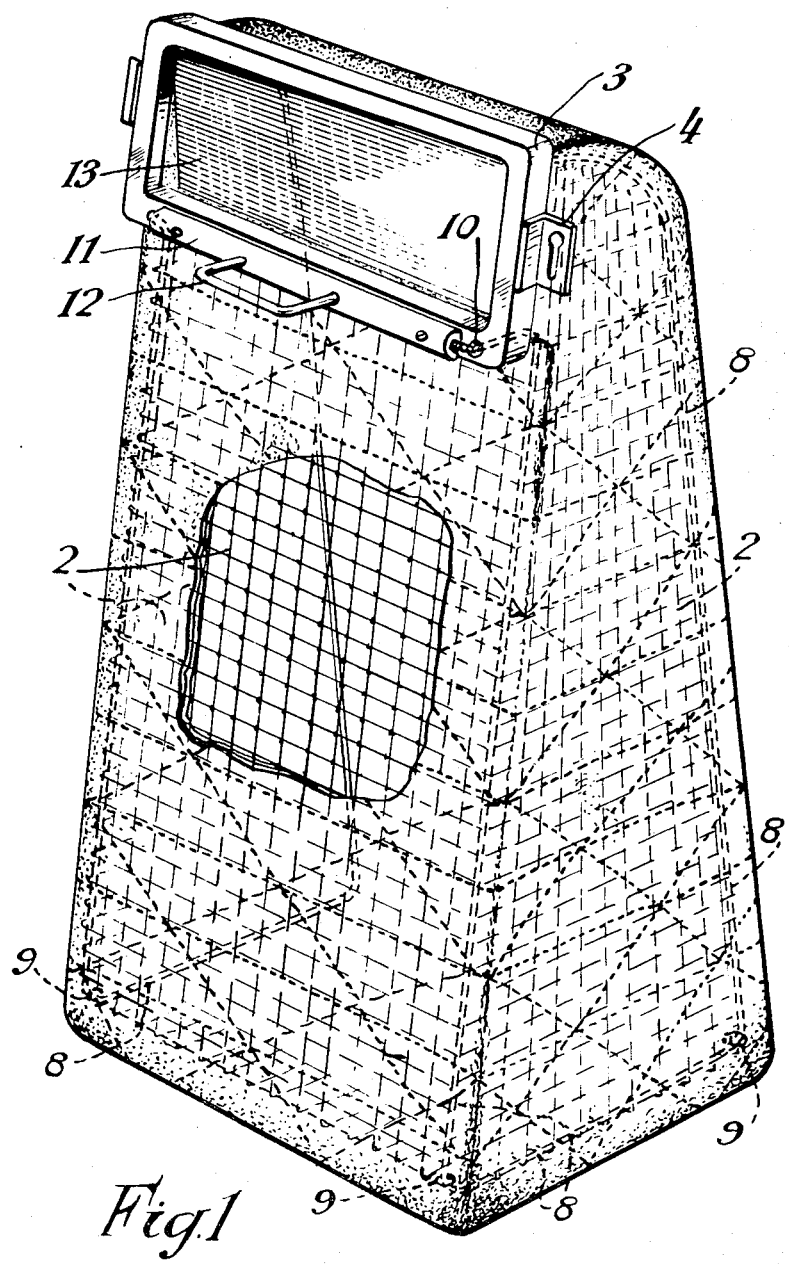

PATENTED SEP 19 1972

INVENTOR
CAROL ANN FRANIEL
BY
ATTORNEY

LAMINATES

This invention related to laminates and provides an improved laminate having a ceramic layer faced with a fabric impregnated with a silicone rubber.

Thus the laminate may be of sandwich form having a center ceramic layer on each face of which is coated a suitable adhesive, preferably an impact type. A fabric such as a woven fiberglass cloth is applied to each coated face. The fabric is precoated or subsequently coated by spraying, dipping, or preferably brushing with a silicone rubber resistant to high temperatures, the solvents of which are evaporated or dried out by suitable means.

To obtain more cohesion the laminate may then be compacted to the density required by, for example, a rolling operation. The laminate can then be stapled or stitched by machining in a quilted pattern form.

To obtain thicker laminate assemblies a multiplicity of laminates are laid one on top of another and are bonded together in such a manner that, so far as is practical, the stitching or stapling in any laminate does not coincide with the stitching or stapling of an adjacent laminate.

The overall thickness of each laminate and the resultant laminate assembly can be predetermined and adjusted as required to obtain the required physical characteristics for any specified or selected application.

Likewise additional components may be applied to the external faces of any laminate or assembly of laminates by plating, metallization spraying or adhesion. One such component is aluminum foil which assists heat reflection, and reduces the heat absorption within and through the laminate.

The ceramic layer may be in a powder, paste or sheet form, and it may be of any molecular size including fibers in its construction. Prior to assembly the ceramic layer may be processed so as to reduce or eliminate any moisture or solvent inclusion. The ceramic can be a suitable china clay or other processed mineral ore, the chief characteristics of which are heat, moisture, burning and chemical resistance.

An efficient and preferred proprietory ceramic contains alumina silicate as an important element. One specific ceramic which has proved most satisfactory is that material sold under the Trade Mark Triton Kaowool by Morganite Ceramic Fibers Limited.

The adhesive layers are mainly for bonding purposes, and as well as being moisture resistant, enhance the flexibility of the laminate. A suitable impact adhesive is that sold by Evode Limited under the Serial No. 613 S.

The outer siliconized rubber layer is moisture, chemical, gas (especially oxygen), and electrically resistant. It is moderately fire resistant, is flexible, non toxic, and it mechanically strengthens the tensile strength of the resultant laminate. A suitable silicone rubber is sold by Midland Silicones Limited under the Ser. No. DP 2446.

Laminate assemblies can be produced which are either flexible or rigid as required for the application concerned.

Laminates according to the present invention can be used for cladding the interior or exterior surfaces of aircraft, vehicles, ships, buildings, machinery, instruments, kiosks, etc.

Packing cases on containers may also be protected against moisture, chemical, temperature, or fire risks, both from within or without the container.

Laminates in suitable form can also be used for protective clothing such as suits, aprons, headgear, gloves, etc.

The main application may, however, well be for waste disposal containers on aircraft, ships, vehicles, or in industrial premises.

In all the above examples the laminate increases the protection against fire in particular, as well as chemical, gas, insulation or electrical risks.

The laminate is light in weight, low in volume, flexible or rigid as required, strong from a tensile point of view, non flaking or powdering from a respiratory point of view, non toxic and competitive in cost.

A particular embodiment of the invention as applied to a waste-disposal container will now be described by way of example and with reference to the accompanying drawings wherein:

FIG. 1 is a perspective view of the container with a part of the outer wall thereof cut away;

Figure 3:
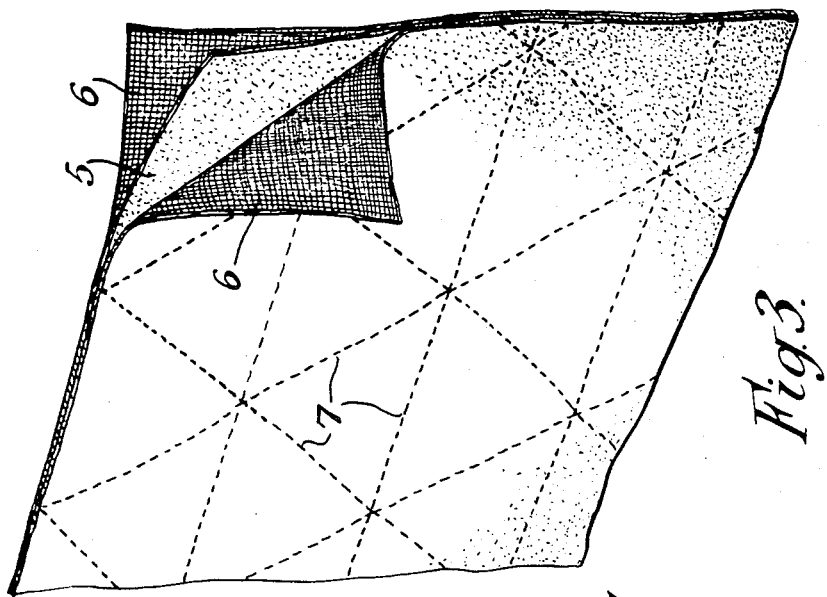
FIG. 3 is a scrap view of a piece of laminate from the outer wall of the container.

The The flexible container shown in the drawings diverges towards its closed base and has an outer wall 1 formed of a laminate in accordance with the invention and an internal netting bag 2. The mouths of the outer wall 1 and the bag 2 are fixed to a rectangular metal frame 3 having key-hole slots 4 for securing the container to a supporting structure. It will be seen that the only entry to the container is through the frame 3. A hinged flap 13 spring- or gravity-biassed to the closed position normally closes the mouth of the container.

The laminate from which the wall 1 is formed is shown in FIG. 3 and comprises a ceramic layer 5 faced on either side with a layer 6 of woven fiberglass impregnated with a silicone rubber. The layers 6 are stuck to the layer 5 with a contact adhesive and lines 7 of stitches form a quilted pattern.

A cord 8 extends from each upper corner of the frame 3, through loops 9 at the lower part of the netting bag 2 to emerge through a hole 10 in the corresponding lower corner of the frame 3. The end part of each cord 8 emerging from its hole 10 is fixed to the respective end of a rod 11. The rod 11 has an operating handle 12.

Figure 2:
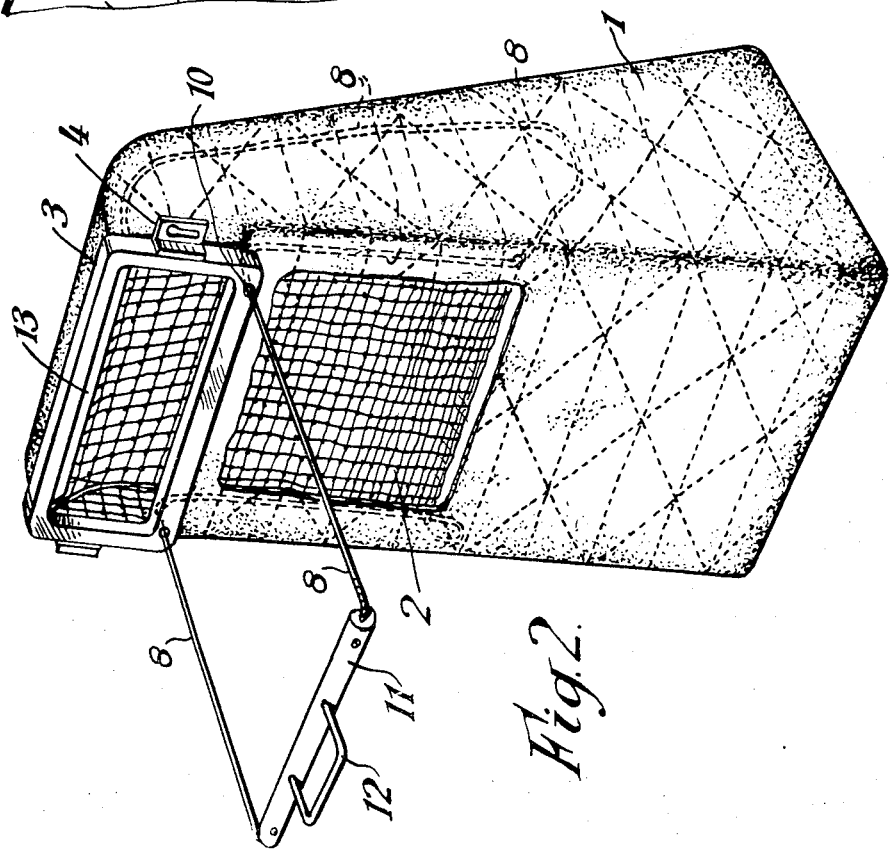
FIG. 2 is a view similar to FIG. 1 showing how the container is emptied.

In the normal operative condition of the container shown in FIG. 1 the netting bag 2 is fully extended and the rod 11 lies alongside the lower side of the frame 3. In this condition waste is inserted into the container to be held by the netting bag. When the container is to be emptied the rod 11 is pulled forward as shown in FIG. 2. The strings 9 are pulled to draw the base of the netting bag upwardly to discharge the contents of the container through the frame 3.

Inside the container as optional extras may be placed a fire alarm unit automatically operated when combustion takes place, which may be electrically, chemically, or pneumatically actuated to provide an adjacent or remote alarm signal as required.

In addition or as an alternative to the above may be located a chemical, powder, or gas fire extinguisher operated automatically in the event of a fire.

However from experience experimentally, due to the special construction and materials of the laminate container it had been found that in the event of combustion within the container the fire was totally confined thereto, and the temperature of the exterior of the container and its surroundings was very little above the ambient temperature.

In practice the combustion gases rise vertically, any oxygen within the container being quickly consumed, and the fire thus extinguishes itself.

I claim:

1. A flexible waste-disposal container comprising a sealed base portion having a waste inlet at its upper end, an outer wall formed of a laminate comprising a ceramic layer and a layer of woven fiberglass fabric impregnated with homogenous silicon rubber secured respectively to each face of the ceramic layer, an inner bag to receive the waste and means operable from outside the container to draw the base of the inner bag towards the waste inlet, thereby discharging the waste through the inlet.

* * * * *